US012433522B2

(12) United States Patent
Moreau et al.

(10) Patent No.: US 12,433,522 B2
(45) Date of Patent: Oct. 7, 2025

(54) FOREARM ASSESSMENT AND TRAINING DEVICES, SYSTEMS, KITS, AND METHODS

(71) Applicant: FlexPro Grip, LLC, New Orleans, LA (US)

(72) Inventors: Daryl Moreau, Toledo, OH (US); Adam Moreau, St. Petersburg, FL (US); John Randall Haas, Toledo, OH (US)

(73) Assignee: FlexPro Grip, LLC, New Orleans, LA (US)

( * ) Notice: Subject to any disclaimer, the term of this patent is extended or adjusted under 35 U.S.C. 154(b) by 806 days.

(21) Appl. No.: 17/534,589

(22) Filed: Nov. 24, 2021

(65) Prior Publication Data

US 2022/0160293 A1  May 26, 2022

Related U.S. Application Data

(60) Provisional application No. 63/118,125, filed on Nov. 25, 2020.

(51) Int. Cl.
*A61B 5/22* (2006.01)
*A61B 90/00* (2016.01)
(Continued)

(52) U.S. Cl.
CPC .............. *A61B 5/225* (2013.01); *A63B 24/00* (2013.01); *A63B 24/0003* (2013.01);
(Continued)

(58) Field of Classification Search
CPC .......... A61H 1/0285–0288; A61H 2201/5061; A61H 2201/5071; A61H 2205/065–067;
(Continued)

(56) References Cited

U.S. PATENT DOCUMENTS 3,347,547 A 10/1967 Hynes
4,121,824 A 10/1978 Hirschfield
(Continued)

FOREIGN PATENT DOCUMENTS

CN 108186284 A * 6/2018 ............ A61F 5/0118
KR 20160001932 A 1/2016
(Continued)

OTHER PUBLICATIONS

Machine translation of Item N, CN-108186284 (Year: 2024).*
(Continued)

*Primary Examiner* — Tse W Chen
*Assistant Examiner* — Alice Ling Zou
(74) *Attorney, Agent, or Firm* — MacMillan, Sobanski & Todd, LLC

(57) ABSTRACT

A forearm assessment and training device has a main support, a plurality of finger motion transmission members, a plurality of finger receivers, and a control module. Each of the finger motion transmission members has a member body with a first end and a second end. The first end of the member body of each of the finger motion transmission members is connected to the main support. Each of the finger receivers is connected to the member body of one of the finger motion transmission members. Each of the finger receivers has a finger aperture. The control module is connected to the main support. The control module includes a control module processor, a control module memory, and a sensor. The sensor is configured to measure a force applied to at least one of the finger motion transmission members.

10 Claims, 13 Drawing Sheets

(51) Int. Cl.
*A63B 24/00* (2006.01)
*A63B 21/00* (2006.01)

(52) U.S. Cl.
CPC ..... *A61B 2090/064* (2016.02); *A63B 21/4019* (2015.10); *A63B 21/4021* (2015.10)

(58) Field of Classification Search
CPC .... A61B 5/224–225; A61B 5/45–4595; A61B 5/6825–6826; A61B 2090/064; A61B 2505/09; A61B 5/11–1178; A63B 23/16; A63B 2220/51
See application file for complete search history.

(56) References Cited

U.S. PATENT DOCUMENTS

| | | | |
|---|---|---|---|
| 4,945,902 A * | 8/1990 | Dorer | A63B 21/4025 601/40 |
| 5,157,970 A * | 10/1992 | Lewis, Jr. | A61B 5/225 600/587 |
| 5,456,650 A | 10/1995 | Williams, Jr. et al. | |
| 5,697,103 A | 12/1997 | Wiggins | |
| 6,213,918 B1 | 4/2001 | Rogers, Jr. | |
| 6,389,601 B2 | 5/2002 | Kleinert | |
| 7,731,633 B1 | 6/2010 | Williams | |
| 8,221,253 B2 | 7/2012 | Lidenberg | |
| 8,348,810 B2 | 1/2013 | Land et al. | |
| 8,572,764 B2 | 11/2013 | Thellmann | |
| 9,326,909 B2 | 5/2016 | Liu et al. | |
| 9,345,424 B2 * | 5/2016 | Wang | A61B 5/6806 |
| 9,375,382 B2 | 6/2016 | Fausti et al. | |
| 9,764,190 B2 | 9/2017 | Hoffman et al. | |
| 10,173,099 B2 | 1/2019 | Christoforou et al. | |
| 10,252,105 B2 | 4/2019 | Dickens | |
| 2003/0073939 A1 | 4/2003 | Taylor et al. | |
| 2006/0211964 A1 | 9/2006 | Farrell et al. | |
| 2010/0121241 A1 | 5/2010 | Nyi | |
| 2010/0222189 A1 | 9/2010 | Washington | |
| 2010/0305717 A1 * | 12/2010 | Tong | A63B 21/4019 623/64 |
| 2011/0301001 A1 | 12/2011 | Hopper | |
| 2013/0041302 A1 | 2/2013 | Williams | |
| 2015/0375042 A1 * | 12/2015 | Schaffer | A61B 5/6803 482/8 |
| 2016/0296345 A1 * | 10/2016 | Deshpande | A61F 2/586 |
| 2017/0079560 A1 | 3/2017 | Bae et al. | |
| 2018/0177666 A1 * | 6/2018 | Tsui | A61H 1/0288 |
| 2018/0228407 A1 | 8/2018 | Olds et al. | |
| 2018/0303698 A1 | 10/2018 | Wijesundara et al. | |
| 2020/0050269 A1 * | 2/2020 | Gu | B25J 9/0006 |
| 2021/0361192 A1 | 11/2021 | Park et al. | |

FOREIGN PATENT DOCUMENTS

| | | |
|---|---|---|
| WO | 9403238 | 2/1994 |
| WO | 2019092559 A1 | 5/2019 |
| WO | 2020162698 A1 | 8/2020 |
| WO | 2020162700 A1 | 8/2020 |

OTHER PUBLICATIONS

International Search Report and Written Opinion, Application No. PCT/US2021/060686, dated Feb. 16, 2022.
European Communication pursuant to Article 94(3), Application No. 21831394.8, dated Apr. 9, 2025.

* cited by examiner

FOREARM ASSESSMENT AND TRAINING DEVICES, SYSTEMS, KITS, AND METHODS

CROSS-REFERENCE TO RELATED APPLICATIONS

This application claims priority to U.S. provisional application No. 63/118,125, filed on Nov. 25, 2020, the entire contents of which are incorporated into this disclosure.

FIELD

The disclosure relates to the field of physical assessment and training. More particularly, the disclosure relates to devices, kits, systems, and methods for assessing and training the muscles and tendons of the forearm, wrist, and fingers in a beneficial manner. Specific examples relate to devices suitable for assessing and training muscles and tendons in the forearm and fingers to reduce the risk of injury for an athlete, such as a baseball pitcher, and to improve pitch command, throwing velocity, and the ability to impart spin on a baseball. The devices are also suitable for use in the treatment of sports- and non-sports-related injuries and conditions, including lateral and medial epicondylitis, injuries to the ulnar collateral ligament, forearm strain, carpal tunnel syndrome, and others.

BACKGROUND

Various extrinsic and intrinsic muscles and tendons of the forearm affect the ability to grip an object; to flex, extend, adduct, abduct and circumduct the fingers and wrist; to pronate and supinate the forearm; and to protect the lateral and medial ulnar collateral ligaments (MUCL) from injury. Injuries to these muscles, such as tears and even ruptures of associated tendons, as well as injuries to the lateral and medial ulnar collateral ligaments are common and often lead negatively impact function and performance. Indeed, injuries to these muscles frequently limit function of the hand and require extensive rehabilitative work Ulnar collateral ligament (UCL) tears are particularly concerning for athletes, especially baseball players. Peak load placed on the elbow when throwing a baseball at high velocity places roughly three times more torque on the elbow than the UCL can handle alone. This torque gets distributed across three structures, the UCL, the radial humeral joint, and the muscles crossing the medial side of the elbow. This torque is directly correlated to how hard the baseball is thrown. Undesirably, if the peak torque exceeds the capacity of these three structures, the UCL experiences microtears or an acute rupture.

The likelihood of an UCL tear is increased as the muscles surrounding the UCL, such as the flexor digitorum superficialis (FDS), the flexor carpi ulnaris (FCU), and the flexor digitorum profundus (FDP), fatigue. This can particularly impact baseball pitchers, as pitching a baseball with fatigued muscles can increase the risk of injury by 3600%. Muscles and/or tendons reduce the amount of strain placed on ligaments due to their stiffness. Stiffness refers to the properties of the muscle tendon unit when being stretched, not to the flexibility. As muscles fatigue they become 16-21% less stiff. In the case of the UCL, as any of the muscles and tendons capable of offloading torque that gets placed on the UCL fatigue, they become less stiff, resulting in more torque being placed on the UCL, and subjects the UCL to forces that can cause the UCL to tear. Therefore, the stiffer the FDS, FCU, and FDP, the more these muscles can resist the tensile force that otherwise gets placed on the UCL when throwing a baseball.

In addition, to militating against UCL tears, strengthening the FDS, FCU, and FDP has also been found to directly impact velo, movement, and command of a baseball pitch. For example, the FCU, along with the extensor carpi ulnaris (ECU), primarily controls the wrist ulnar deviation, which directly affects command. In addition, strengthening the FDS, FCU, and FDP allows athletes to train longer and harder before muscle fatigue subjects the UCL to excessive torque.

While the art includes examples of devices that can be used to aid rehabilitation from these injuries and/or strengthen muscles, these devices suffer from various drawbacks. For example, many available devices lack the ability to optimally target the FDS, FDU, and FDP, or are unable to provide the user with quantifiable, measurable feedback that is necessary to enable the user to achieve their training objectives.

There is a continuing need for improved forearm assessment and training devices, systems, kits, and methods.

BRIEF SUMMARY OF SELECTED EXAMPLES

Various example forearm assessment and training devices are described.

An example forearm assessment and training device has a main support, a plurality of finger motion transmission members, a plurality of finger receivers, and a control module. Each of the finger motion transmission members has a member body with a first end and a second end. The first end of the member body of each of the finger motion transmission members is connected to the main support. Each of the finger receivers is connected to the member body of one of the finger motion transmission members. Each of the finger receivers has a finger aperture. The finger aperture of each of the finger receivers is configured to receive a portion of one of the fingers of a user. The control module is connected to the main support. The control module includes a control module processor, a control module memory, and a sensor. The control module memory has a tangible, non-transitory computer readable medium with stored processor-executable instructions. The sensor is configured to measure a force applied to at least one of the finger motion transmission members.

Various example forearm assessment and training systems are described.

An example forearm assessment and training system has a forearm assessment and training device according to an embodiment, and a software platform. The forearm assessment and training device includes the main support, the plurality of finger receivers, and the control module. The software platform is in communication with the control module. The software platform is configured to receive measurement data from the control module and generate a reportable based on the measurement data.

Various example forearm assessment and training methods are described.

An example forearm assessment and training method includes disposing the forearm assessment and training device, according to one of the embodiments, on a hand of the user; performing a preselected motion; and measuring, by the sensor, a force applied to at least one of the finger motion transmission members corresponding to the preselected motion.

Various example forearm assessment and training kits are described.

An example forearm assessment and training kit includes a forearm assessment and training device according to an embodiment, and a wrist motion transmission member. The forearm assessment and training device has main support, the plurality of finger receivers, and the control module. The wrist motion transmission member is configured to be selectively attached to the main support.

Additional understanding of the inventive forearm assessment and training devices and related systems, kits, and methods can be obtained by reviewing the detailed description of selected examples, below, with reference to the appended drawings.

DETAILED DESCRIPTION OF SELECTED EXAMPLES

The following detailed description and the appended drawings describe and illustrate various example forearm assessment and training devices and relates systems, kits, and methods. The description and illustration of these examples enable one skilled in the art to make and use examples of the inventive forearm assessment and training devices and related systems, kits, and methods. They do not limit the scope of the claims in any manner.

Figure 8:
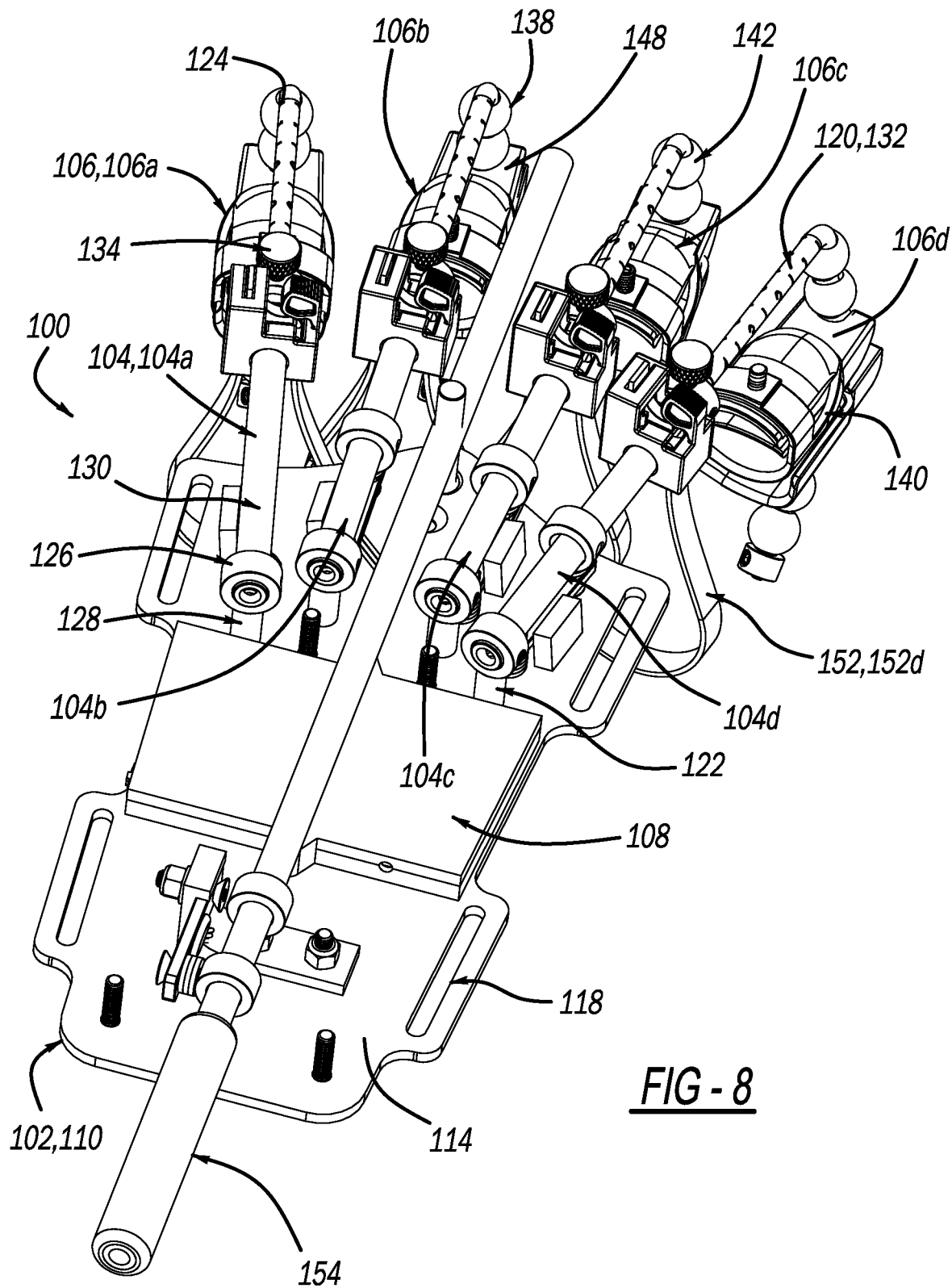
FIG. 8 is a top perspective view of the forearm assessment and training device, shown in FIG. 1. The cover of the device is not included in FIG. 8.

FIGS. 1 through 8 illustrate a first example forearm assessment and training device 100. The forearm assessment and training device 100 has a main support 102, a plurality of finger motion transmission members 104, also referred to as finger motion transmission members 104, a plurality of finger receivers 106, also referred to as finger receivers 106, and a control module 108. The main support 102 has a base 110 with a cover 112. The base 110 includes an inner surface 114 (shown in FIG. 8) and an outer surface 116 (shown in FIG. 3). The inner surface 114 of the base 110 is configured to support internal components. For example, the control module 108 is disposed within the main support 102 on the inner surface 114 of the base 110, as shown in FIG. 8. The outer surface 116 of the base 110 is configured to be disposed adjacent to opisthenar, or backside of a hand of the user. Advantageously, this placement can allow the user to use his or her palm, fingers, and/or thumbs as they normally would during activities of interest, such as gripping, throwing, and/or pitching a baseball, while wearing the forearm assessment and training device 100. In certain examples, the outer surface 116 of the main support 102 includes an anchoring post 117. The anchoring post 117 can be disposed on the outside surface 116 of the main support 102. The anchoring 117 member is configured to be disposed between two fingers of the user. In particular examples, the anchoring post 117 is configured to be disposed adjacent to the webbing of the user and between a middle finger and a ring finger of the user. The anchoring post 117 facilities in securing the main support 102 to the backside of the hand of the user during movement. For example, when the user performs an adduction and/or abduction movement of the wrist, the main support 102 is moved along with the backside of the hand via the middle finger and the ring finger pulling the anchoring post, as the user performs the adduction and/or abduction movement of the wrist. In addition, the anchoring post 117 provides a common reference point for the measuring operations handled by the control module 108, which will be discussed in further detail below.

In the illustrated example, the outer surface 116 of the base 110 is configured to be disposed on a hand securement member (not shown) that is disposed between the forearm assessment and training device 100 and the hand of the user. The hand securement member is a wearable member configured to be worn by the hand of the user. A glove is one example of a suitable hand securement member. Any suitable element can be used as a hand securement member, though, and a skilled artisan can select a material and configuration for a hand securement member based on various considerations, including the age of an intended user, the condition of the hand and/or forearm of an intended user (such as the condition of the tissue and/or skin), and any expected activities an intended user may perform while wearing the forearm assessment and training device 100, among other considerations.

Figure 1:
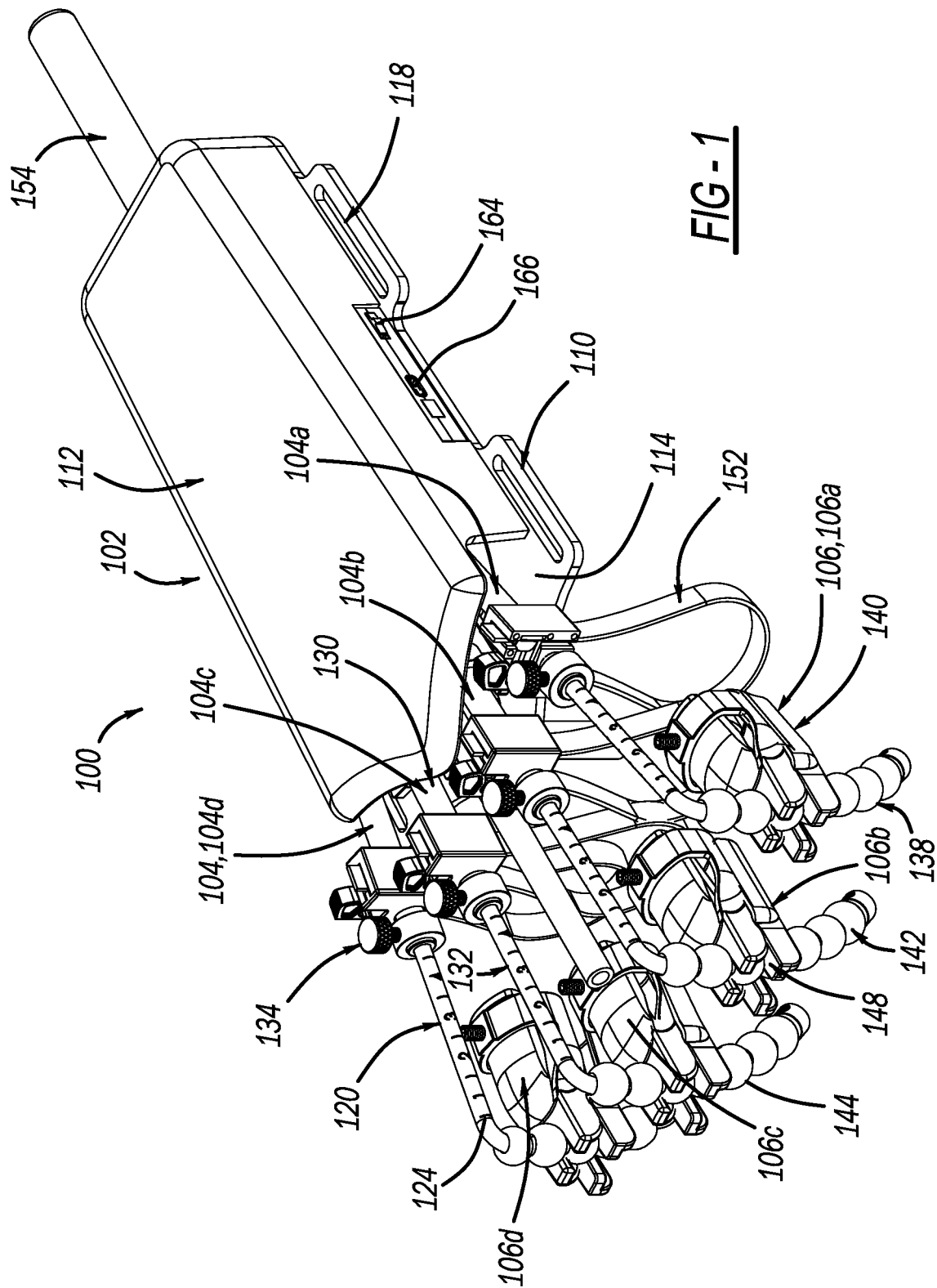
FIG. 1 is a top perspective view of a first example forearm assessment and training device.
Figure 2:
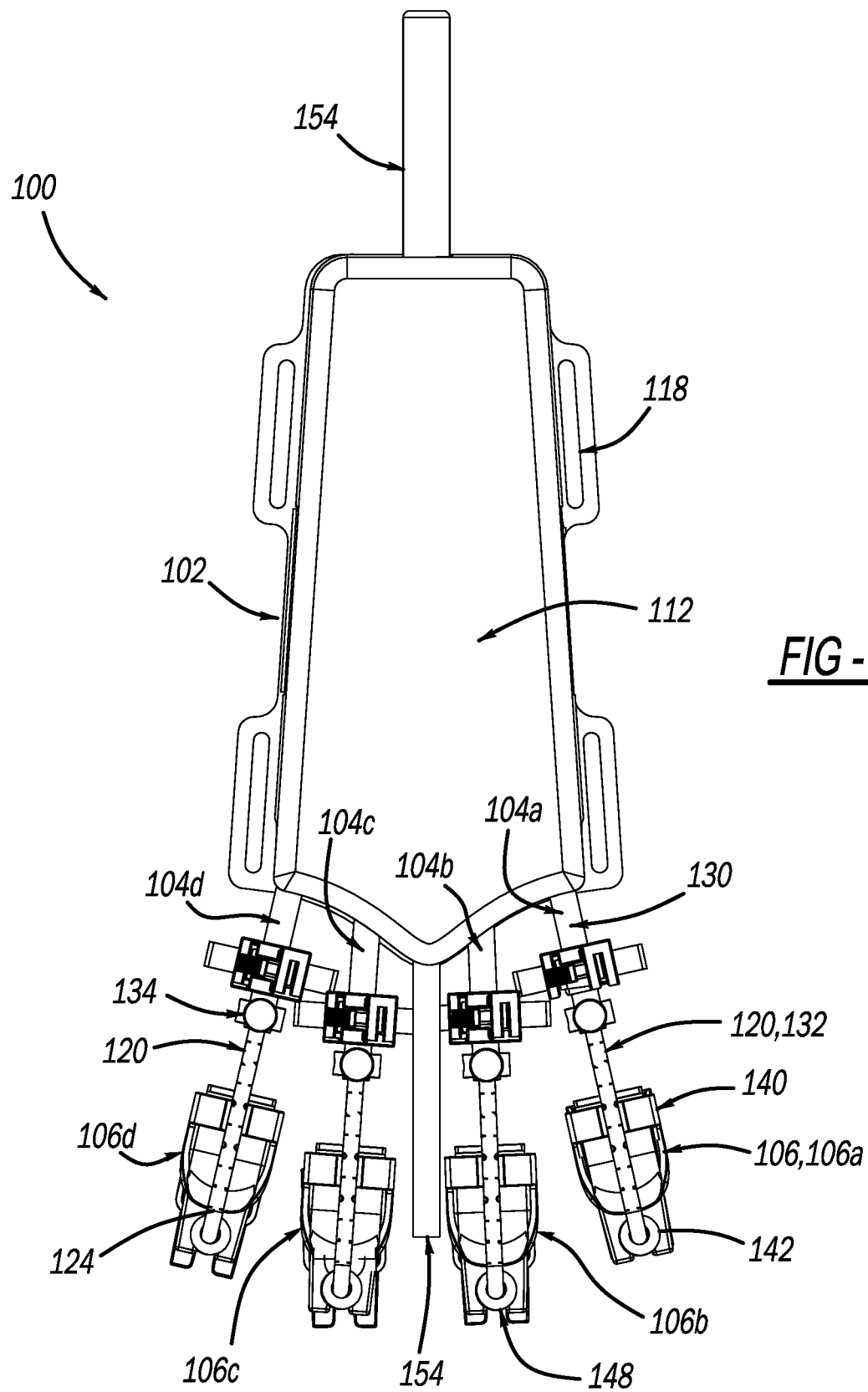
FIG. 2 is a top plan view of the forearm assessment and training device shown FIG. 1.
Figure 3:
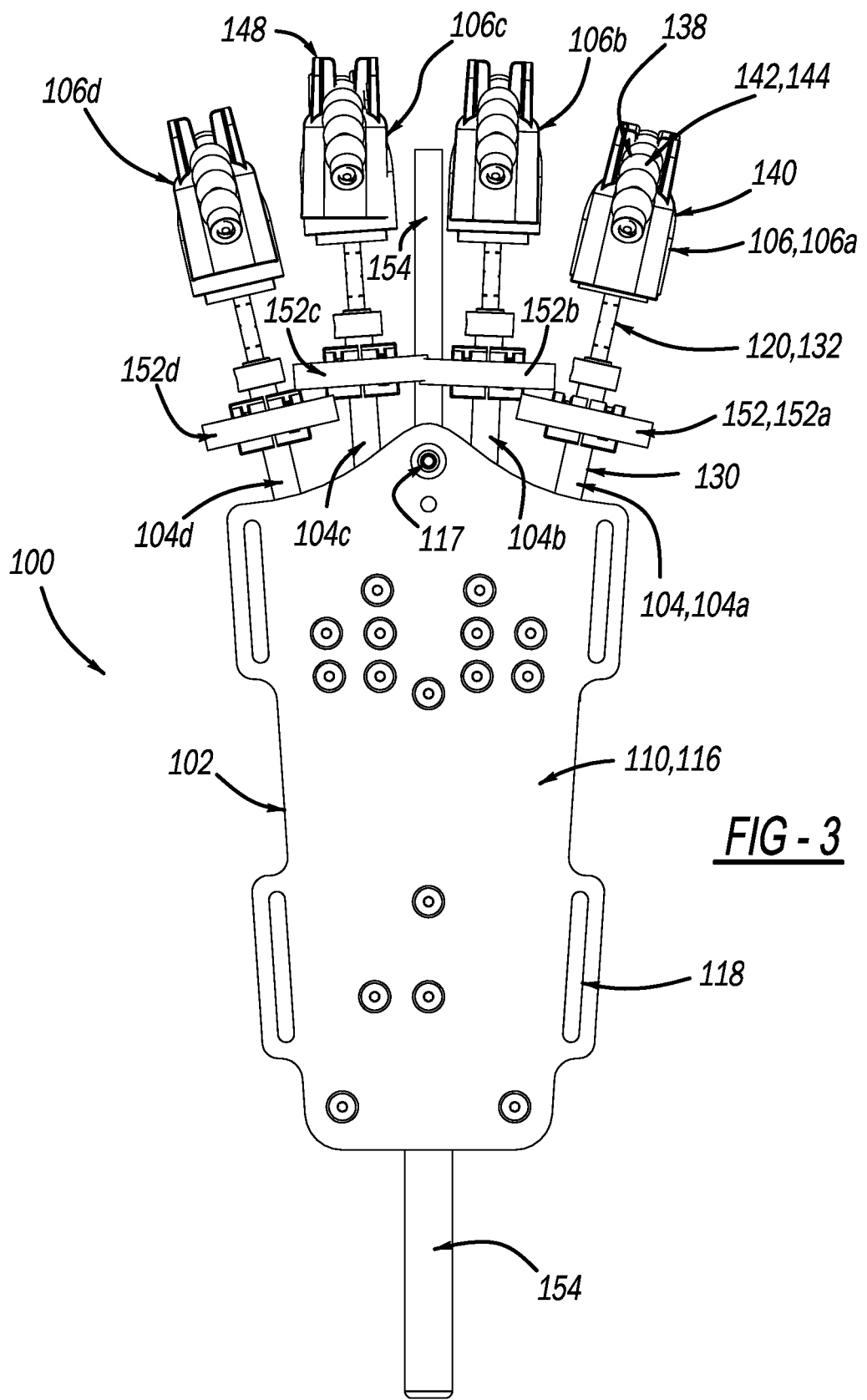
FIG. 3 is a bottom plan view of the forearm assessment and training device shown in FIG. 1.

The cover 112 is disposed over the inner surface 114 of the base 110 (shown in FIGS. 1-2). The cover 112 is configured to enclose and secure the internal components inside the main support 102. In certain examples, the main support 102 includes a pair of hand strap slots 118, as shown in FIGS. 2-3. The pair of hand strap slots 118 are disposed on the base 110 of the main support 102. The hand strap slots 118 are configured to receive a hand strap (not shown). The hand strap in combination with the hand strap slots 118 is used to secure the main support 102 to the hand of the user. Other non-limiting examples of securing the main support 102 to the hand of the user include magnets and hook and loop fasteners. Although, it should be appreciated that a skilled artisan can include additional and/or different types of securement features and methods, as desired.

As best illustrated in FIGS. 1 and 8, each of the plurality of finger motion transmission members 104 is an elongate member and configured to correspond to one of the fingers of a user. In particular examples, each of the plurality of finger motion transmission members 104 is configured to bend and/or move according to a motion of the corresponding finger. Advantageously, this allows the motion of the corresponding finger to be conducted along the corresponding finger motion transmission member 104. Each of the plurality of finger motion transmission members 104 includes a member body 120 with a first end 122 and a second end 124. The member body 120 can be manufactured from any suitable material, including relatively stiff and relatively flexible materials. In the particular examples, member body 120 is manufactured from metal, such as a steel. However, it should be appreciated that the member body 120 can be manufactured from a relatively flexible material, such as a flexible metal, a polymeric material, a rubber material, or other suitable flexible material. Relatively flexible materials can be advantageous in embodiments in which it is desired to provide a degree of flexion to each of the plurality of finger motion transmission members 104.

With reference to FIG. 8, the first end 122 of one or more of the plurality of finger motion transmission members 104 is connected to the main support 102. In the illustrated example, the first end 122 of one or more of the plurality of finger motion transmission members 104 includes a member linkage 126. The member linkage 126 of one or more of the plurality of finger motion transmission members 104 has a standoff 128. The standoff 128 is connected to the first end 122 and disposed on the inner surface 114 of the base 110 of the main support 102. The standoff 128 elevates the connected finger motion transmission member from the inner surface 114 of the base 110 of the main support 102, which allows the connected finger motion transmission member 104 to bend and/or move along the standoff 128. Desirably, this can permit the connected finger motion transmission member 104 to conduct the motion of the corresponding finger.

As best illustrated in FIGS. 1 and 8, the plurality of finger motion transmission members 104 include an index finger transmission member 104a, a middle finger transmission member 104b, a ring finger transmission member 104c, and a little finger transmission member 104d. The index finger transmission member 104a corresponds to an index finger of the user. The middle finger transmission member 104b corresponds to the middle finger of the user. The ring finger transmission member 104c corresponds to the ring finger of the user. The little finger transmission member 104d corresponds to a little finger of the user. However, it should be appreciated that one of finger motion transmission members 104 can be removed, if desired. In addition, a skilled artisan can scale the number of the finger motion transmission members 104, e.g., add a thumb transmission member to correspond to a thumb of the user.

With reference to FIG. 8, the member body 120 of one or more of the finger motion transmission members 104 includes a tube portion 130 and a rod portion 132. The tube portion 130 includes the first end 122 of the member body 120. The rod portion 132 includes the second end 124 of the member body 120. The tube portion 130 telescopically receives the rod portion 132, which can allow the rod portion 132 to be axially adjusted according to a length of a corresponding finger of a user, e.g., the rod portion 132 can be moved towards and away from the main support 102. As an example, if the index finger of the user is longer than the index finger transmission member 104a, the user can move the rod portion 132 of the index finger transmission member 104a away from the main support 102 so that the index finger transmission member 104a corresponds to the length of the index finger of the user. Likewise, if the little finger of the user is shorter than the little finger transmission member 104d, the user can move the rod portion 132 of the little finger transmission member 104d towards the main support 102 so that the little finger transmission member 104d corresponds to the length of the little finger of the user. In addition, the rod portion 132 can be fully removed from the tube portion 130, which can be beneficial in circumstances where the force of a particular finger does not need to be captured by the forearm assessment and training device 100. It should be appreciated other connection types and technologies are contemplated to facilitate similar functionality. For example, the member body 120 can include a single elongate member, which can be axially adjusted when not locked into a fixed position.

As shown in FIGS. 1-2, 4, and 6-8, each finger motion transmission member of the plurality of finger motion transmission members 104 include a locking fastener 134. The locking fastener 134 is configured to lock and unlock the rod portion 132 to the tube portion 130, which can permit the user to lock and unlock the rod portion 132 into position. Desirably, the locking fastener 134 can militate against the rod portion 132 from moving during the operation of the forearm assessment and training device 100, while also allowing the user to adjust the position of the rod portion 132 when required. A non-limiting example can include a thumbscrew, however different types of adjustable fasteners and locking mechanisms can also be employed, as desired.

Each of the finger receivers 106 is connected to the member body 120 of one of the finger motion transmission members 104, as shown in FIG. 1. In certain examples, each of the finger receivers 106 is connected to the second end 124 of the member body 120 of one of the finger motion transmission members 104. Each of the finger receivers 106 has a finger aperture 136. The finger aperture 136 is configured to receive a portion of one of the fingers of the user. With respect to one embodiment (shown in FIGS. 1-8), each of the finger receivers 106 has a member adjuster portion 138 and a removeable fingertip portion 140. The member adjuster portion 138 is connected to the second end 124 of the member body 120 of one of the finger motion transmission members 104. The member adjuster portion 138 includes a plurality of enlarged members 142 arranged in a column of enlarged members 144. Adjacent pairs of the enlarged members 142 are separated by an intermediate saddle portion 146. As will be discussed in detail below, the column of enlarged members 144 facilitates connecting the removable fingertip portion 140 with the member adjuster portion 138. The member adjuster portion 138 is substantially curved towards the main support 102. However, the member adjuster portion 138 can be substantially straight, if desired. In particular examples, each of the enlarged members 142 has a substantially spherical shape. It should be appreciated that one skilled in the art can change the number and shape of the enlarged members 142, within the scope of this disclosure.

Figure 4:
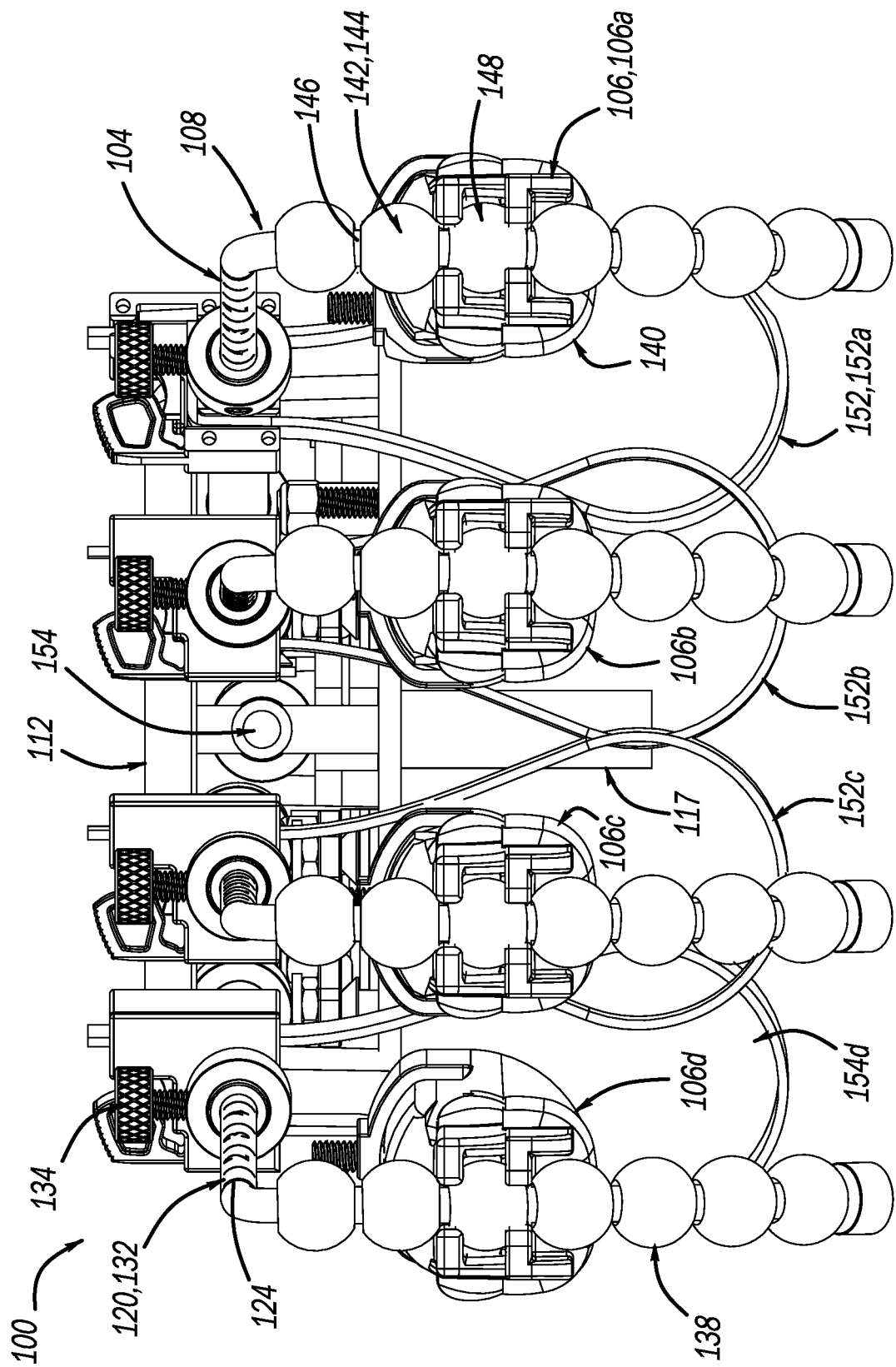
FIG. 4 is a front elevational view of the forearm assessment and training device shown in FIG. 1.

As shown in FIG. 4, the removeable fingertip portion 140 includes the finger aperture 136 and a member slot 148. The finger aperture 136 is configured to receive a distal portion of the finger of the user. The finger aperture 136 is disposed and oriented opposite to the member slot 148. The member slot 148 is configured to removably receive one of the enlarged members 142 of the member adjuster portion 138 of one of the finger receivers 106. Desirably, this structural arrangement can provide a rapid or quick disconnect for individual fingers that allows users to seamlessly move from targeting the flexor digitorum profundus (FDP) to targeting the flexor digitorum superficialis (FDS). This also allows targeting of individual fingers, which is beneficial because the force (MVC) produced by a finger in a multi finger task represents only 60-75% of the force produced by finger in a single finger task. To build optimal musculotendon stiffness, loads >=70% of maximum voluntary contraction need to be achieved, and are not achieved by most conventional exercises, which are unable to isolate each finger individually. This is one reason most traditional exercises fail to adequately train the finger flexor or extensor muscles. In addition to being able to easily isolate individual fingers, this structural arrangement allows combination training of index and middle fingers, and indeed any combination of fingers. Also, the user can adjust the positioning of each of the finger receivers 106 by placing the desired enlarged member 142 into the corresponding member slot 148. It is believed without being bound to a particular theory, that the attachment of the distal portion of one of the fingers of the user to one of the finger motion transmission members 104 facilitates measuring forces that are related to the FDP of the user.

With reference to FIG. 4, the finger receivers 106 include an index finger receiver 106a, a middle finger receiver 106b, a ring finger receiver 106c, and a little finger receiver 106d. The index finger receiver 106a corresponds to the index finger of the user. The middle finger receiver 106b corresponds to the middle finger of the user. The ring finger receiver 106c corresponds to the ring finger of the user. The little finger receiver 106d corresponds to the little finger of the user. However, it should be appreciated that one of finger receivers 106 can be removed, if desired. In addition, a skilled artisan can scale the number of the finger receivers 106, e.g., add a thumb receiver to correspond to the thumb of the user.

Figure 5:
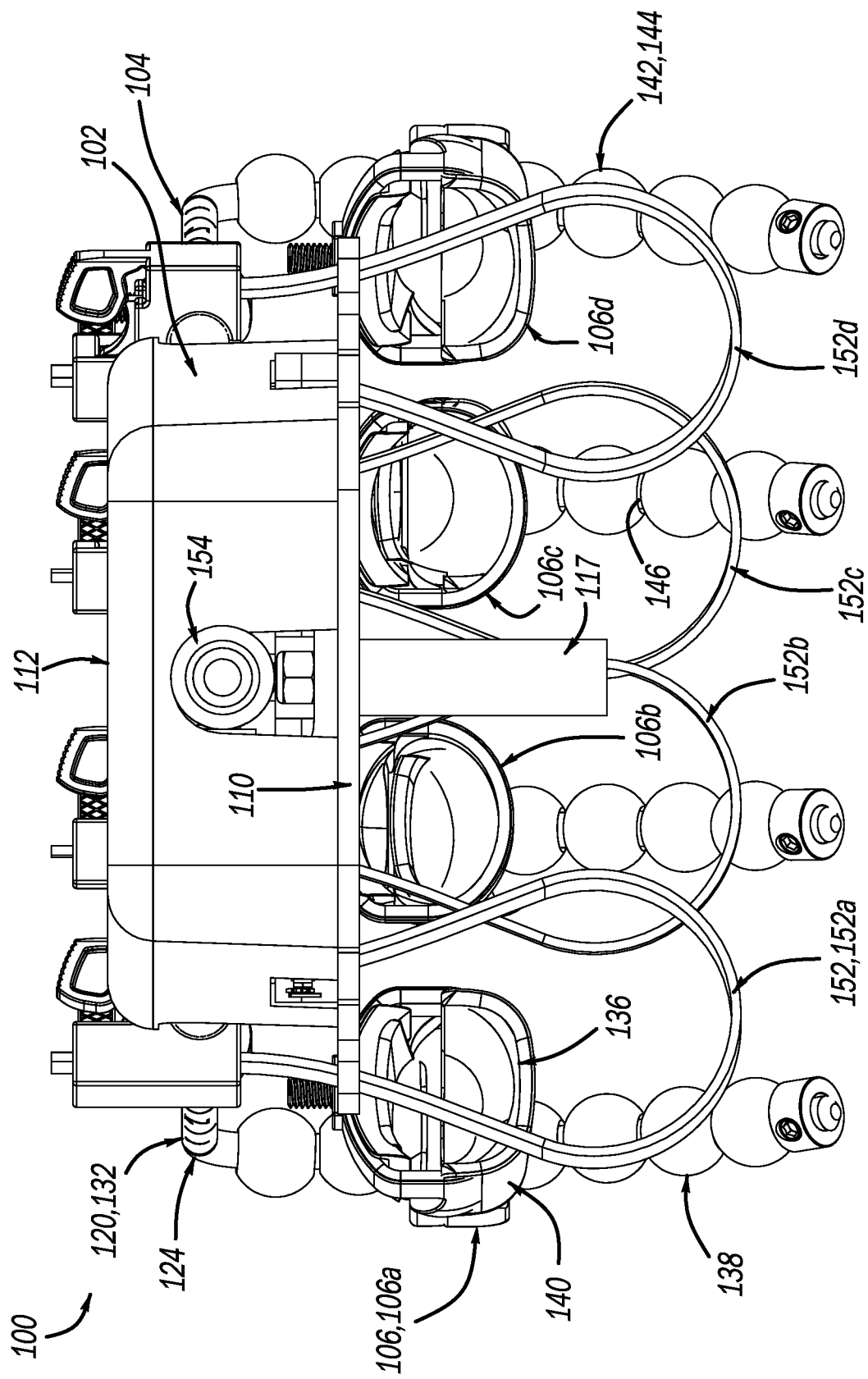
FIG. 5 is a rear elevational view of the forearm assessment and training device shown in FIG. 1.

As shown in FIG. 5, in certain embodiments, the forearm assessment and training device 100 has a plurality of adjustable finger slings 152. Each of the adjustable finger slings 152 is connected to one of the finger motion transmission members 104. In particular examples, each of the adjustable finger slings 152 is disposed between the first end 122 and the second end 124 of one of the finger motion transmission members 104. Each of the adjustable finger slings 152 is configured to receive and support a middle portion of one of the fingers of the user. In certain examples, the middle portion is adjacent to a proximal interphalangeal joint of one of the fingers of the user. In addition, each of the adjustable finger slings 152 can be tightened and loosened to ensure a suitable fit around the middle portion of one of the fingers of the user. Advantageously, the adjustable finger slings 152 can facilitate securing the forearm assessment and training device 100 to the hand of the user. It is also believed without being bound to a particular theory, that the attachment of middle portion of one of the fingers of the user to one of the finger motion transmission members 104 facilitates measuring forces that are related to the FDS of the user.

The adjustable finger slings 152 include an index finger sling 152a, a middle finger sling 152b, a ring finger sling 152c, and a little finger sling 152d. The index finger sling 152a corresponds to the index finger of the user. The middle finger sling 152b corresponds to the middle finger of the user. The ring finger sling 152c corresponds to the ring finger of the user. The little finger sling 152d corresponds to the little finger of the user. However, it should be appreciated that one of adjustable finger slings 152 can be removed, if desired. In addition, a skilled artisan can scale the number of the adjustable finger slings 152, e.g., add a thumb sling to correspond to the thumb of the user.

As best illustrated in FIGS. 1 and 8, the forearm assessment and training device 100 can also include a wrist motion transmission member 154. The wrist motion transmission member 154 is configured to conduct a force corresponding to a movement of a wrist of the user. In particular examples, the wrist motion transmission member 154 can conduct the force associated with adduction and/or abduction of the wrist. The wrist motion transmission member 154 is connected to the main support 102. As shown in FIG. 8, the wrist motion transmission member 154 is disposed through the main support 102. However, the wrist motion transmission member 154 can be connected to the main support 102 in different configurations, if desired. The wrist motion transmission member 154 is configured to be secured to a forearm of the user. In certain examples, the wrist motion transmission member 154 includes a forearm strap (not shown) to secure the wrist motion transmission member 154 to the forearm of the user. It should be appreciated that a skilled artisan can select different types of fasteners and/or straps to secure the wrist motion transmission member 154 to the forearm of the user, within the scope of this disclosure. It is also believed without being bound to a particular theory, that the attachment of forearm of the user to the wrist motion transmission member 154 facilitates measuring forces that are related to the flexor carpi ulnaris muscle (FCU) of the user.

Figure 12:
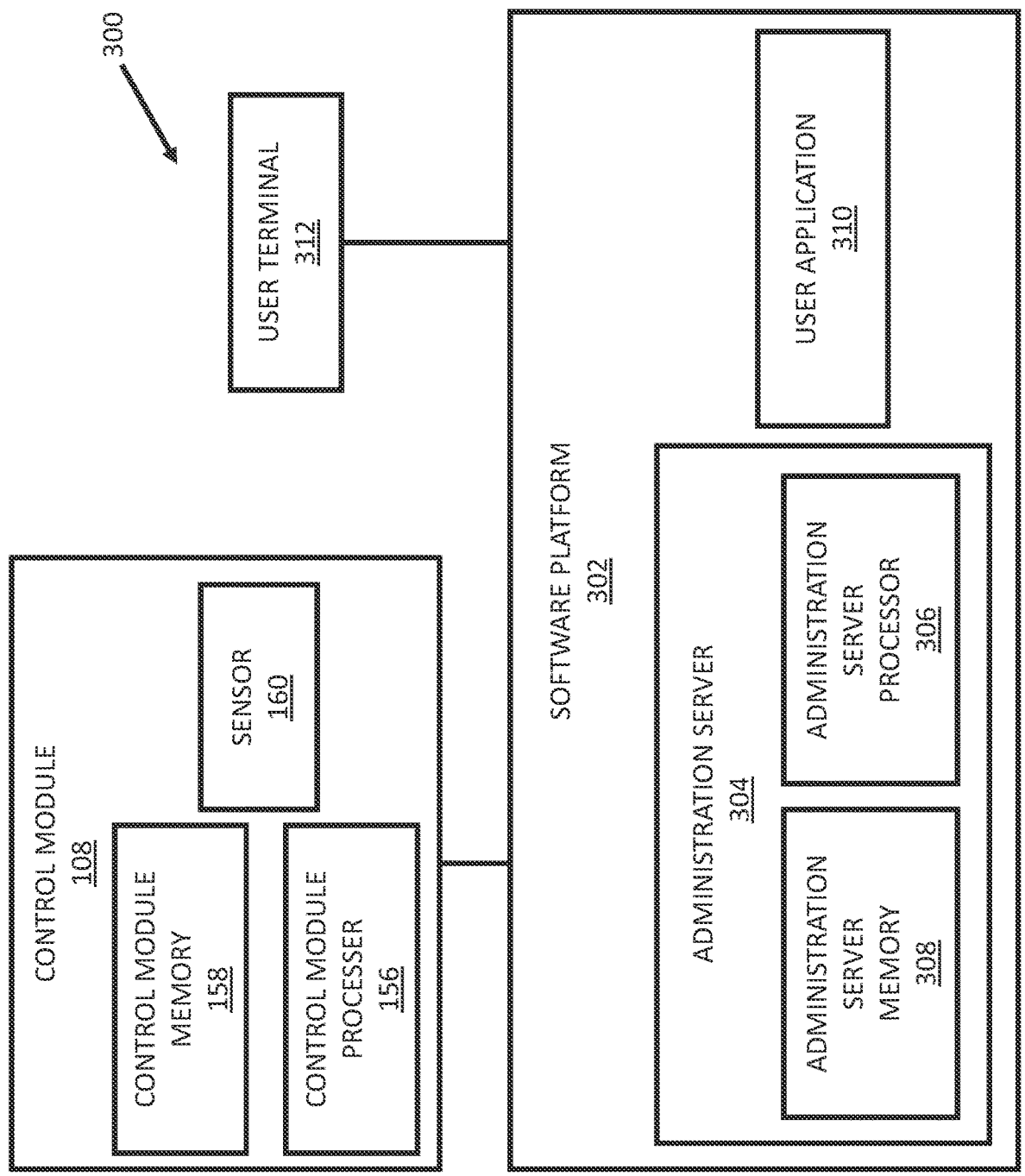
FIG. 12 is a schematic illustration of an example forearm assessment and training system.

The control module 108 is connected to the main support 102, as shown in FIG. 8. In particular examples, the control module 108 is disposed on the inner surface 114 of the base 110 of the main support 102. As shown in FIG. 12, the control module 108 includes a control module processer 156, a control module memory 158, and a sensor 160. The control module memory 158 has a tangible, non-transitory computer readable medium with stored processor-executable instructions. Non-limiting examples of the control module 108 include microcontroller, programmable logic control controller, systems on a chip (SoC), graphical processing units, etc. The control module 108 can also include several other components and features, such as a power source, a power selector 164, and a communication port 164. The power source is configured to power the control module 108. A non-limiting example of the power source includes a battery. The power selector 164 is configured to allow the user to selectively power on the control module 108. Non-limiting examples of the power selector 164 includes a switch and button. The communication port 164 is configured to allow the power source to charge and/or allow the control module 108 to transfer information, such as measurements to an outside terminal. A non-limiting example of the communication port 164 includes a universal serial bus (USB). It should be appreciated that one skilled in the art can select different components and features, such as a display screen, for the control module 108, as desired.

The sensor 160 is configured to measure an individual force, total forces, and/or isolated total of forces from one or more of the finger motion transmission members 104 and/or the wrist motion transmission member 154. The measured forces include tension forces, compression forces, pressure forces, and/or torque forces. In particular examples, the measured forces include flexion forces, extension forces, ulnar deviation forces, and/or radial deviation forces. In more particular examples, the measured forces include the flexion force exerted at a proximal interphalangeal joint (PIP) of one or more fingers of the user, the flexion forces exerted at a tip of one or more fingers of the user, and ulnar deviation forces and radial deviation forces exerted on the wrist of the user. It should be appreciated that a skilled artisan can use the sensor 160 to measure other forces, within the scope of this disclosure. Desirably, these measured forces can be correlated and used to determine a fatigue of particular muscles. Non-limiting examples of particular muscles include the FDP, FDS, and FCU of the user. It should be appreciated that the fatigue of other muscles may also be determined using the present technology.

Figure 6:
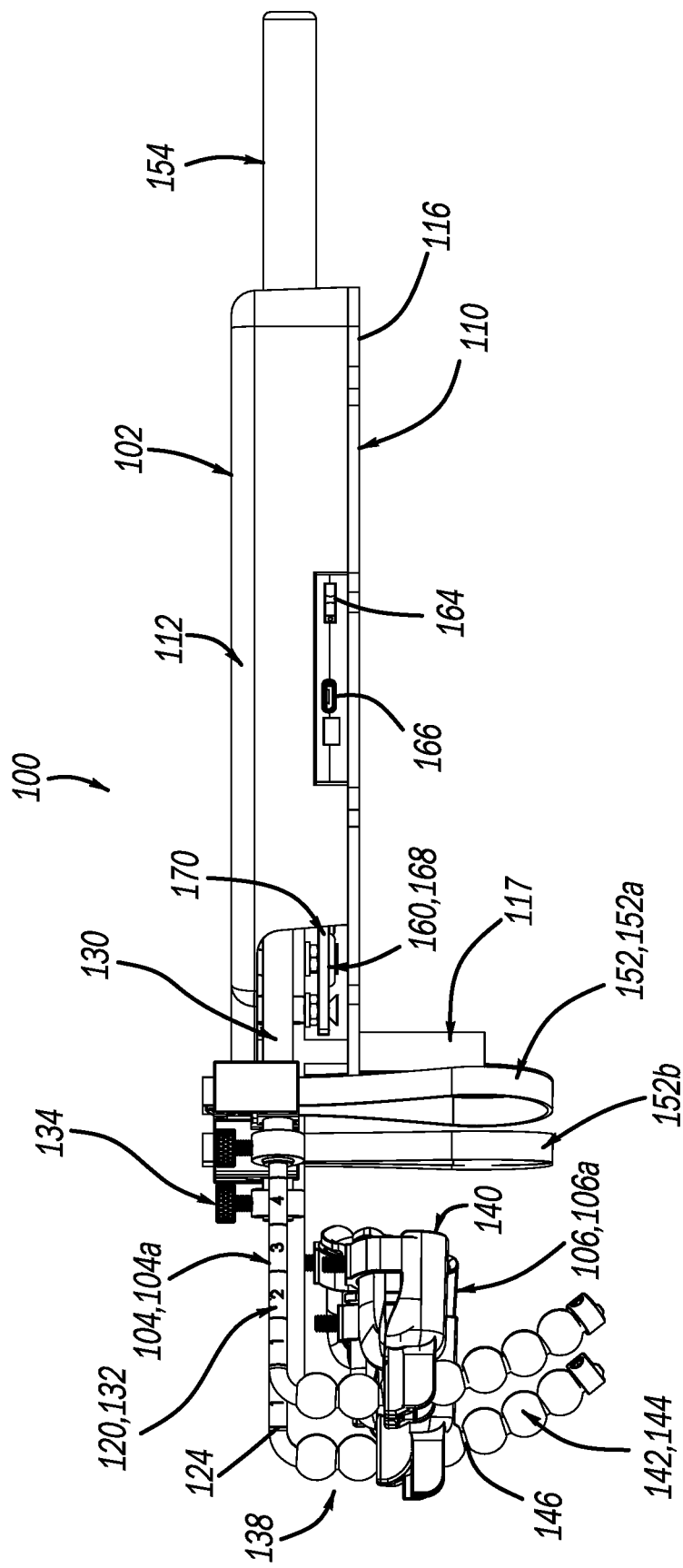
FIG. 6 is a first side elevational view of the forearm assessment and training device shown in FIG. 1.
Figure 7:
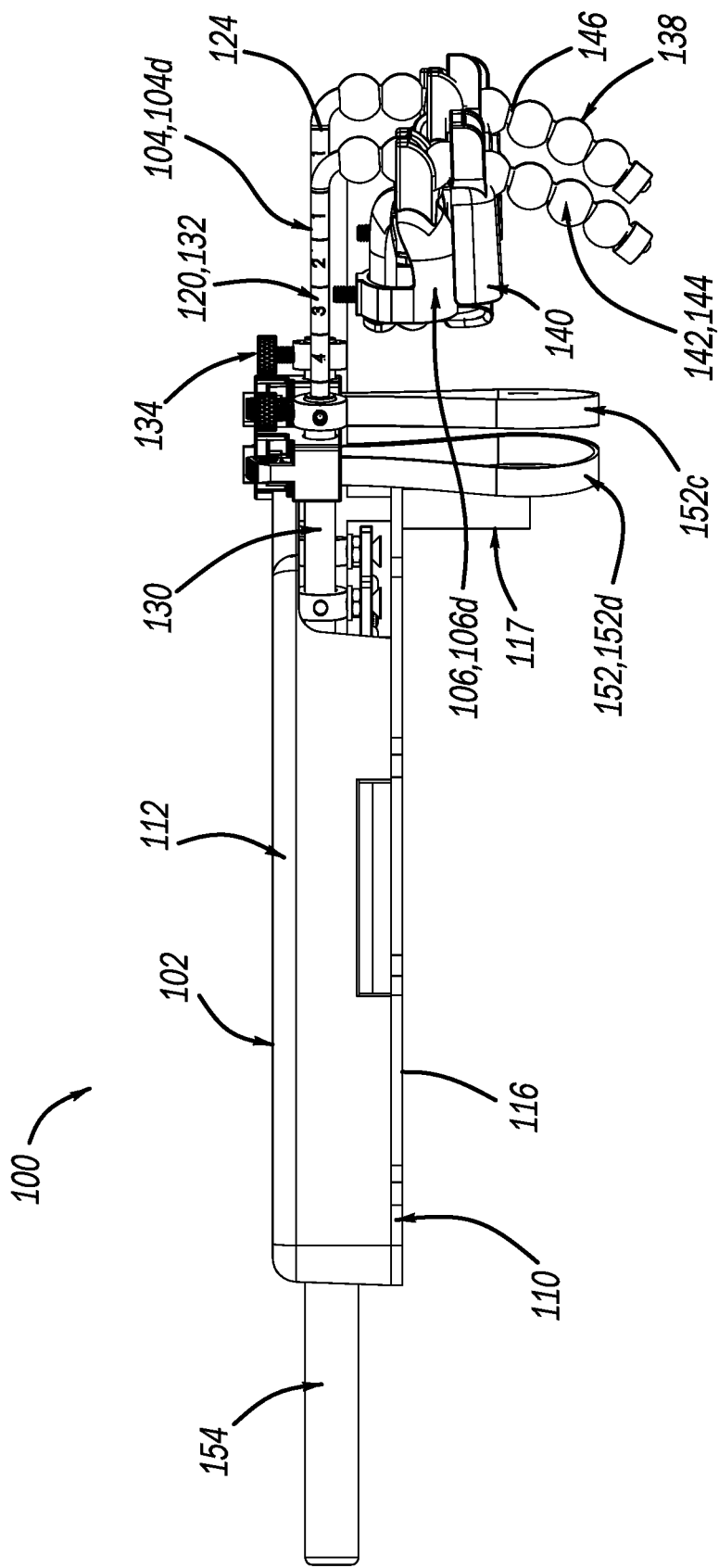
FIG. 7 is a second side elevational view of the forearm assessment and training device shown in FIG. 1.

In particular examples, the measurement operation is accomplished by converting the force applied to at least one of the finger motion transmission members 104 into an electrical signal that can be measured and standardized. In one embodiment, as shown in FIG. 6, the sensor 160 is a strain gauge load cell 160. The strain gauge load cell 160 has a strain gauge 168 and a flexible backing 170. The strain gauge 168 is attached to a flexible backing 170. When the shape of the strain gauge 168 is altered, a change in its electrical resistance occurs. The strain gauge 168 is arranged in a way that, when the force is applied in one direction, a linear change in resistance results. Tension forces can stretch the strain gauge 168, causing it to get thinner and longer, which results in an increase in resistance. Compression force can do the opposite, e.g., the strain gauge 168 compresses, becomes thicker and shorter, which can result in a decrease in resistance. Other non-limiting examples of the sensor 160 include load cells, force sensing resistors, optical force sensors, and ultrasonic force sensors, force plates, and dynamometers. However, it should be appreciated that a skilled artisan can employ different measurement devices, technologies, and methods, as desired.

As discussed, the sensor 160 is configured to measure an individual force, total forces, and/or isolated total of forces from one or more of the finger motion transmission members 104. Desirably, this allows the sensor 160 to measurement the forces associated with moving one finger, multiple fingers, or all of the fingers of the user. In certain examples, the sensor 160 includes a plurality of sensors 160. Each of the sensors 160 is configured to measure the force applied to one of the finger motion transmission members 104 and/or the wrist motion transmission member 154. Advantageously, assigning a separate sensor 160 to a specific finger motion transmission member 104 and/or the wrist motion transmission member 154 can facilitate isolating measured forces by a particular finger or the wrist. It should be appreciated that one skilled in the art can employ different configurations for the sensor 160, as well as scale the number of sensors 160, within the scope of this disclosure.

In certain examples, the sensor 160 can also be configured to measure the force applied to at least one of the finger motion transmission members 104 and/or the wrist motion transmission member 154 at preselected intervals. The preselected intervals include specific time durations during a motion (which can include exercises and/or activities). In particular examples, the preselected intervals include different phases of a particular motion. For example, a typical baseball pitching cycle includes the following phases: stride foot contact (SFC), which can occur 40% through the pitching cycle; maximum shoulder external rotation (MER), which can occur 80% through the pitching cycle and ball release (REL), which can occur 90% through the pitching cycle. This can permit the sensor 160 to isolate and measure the force applied to at least one of the finger motion transmission members 104 and/or the wrist motion transmission member 154 during one of these phases. Advantageously, the user can use this information to improve performance during a particular phase in the pitching cycle.

Figure 9:
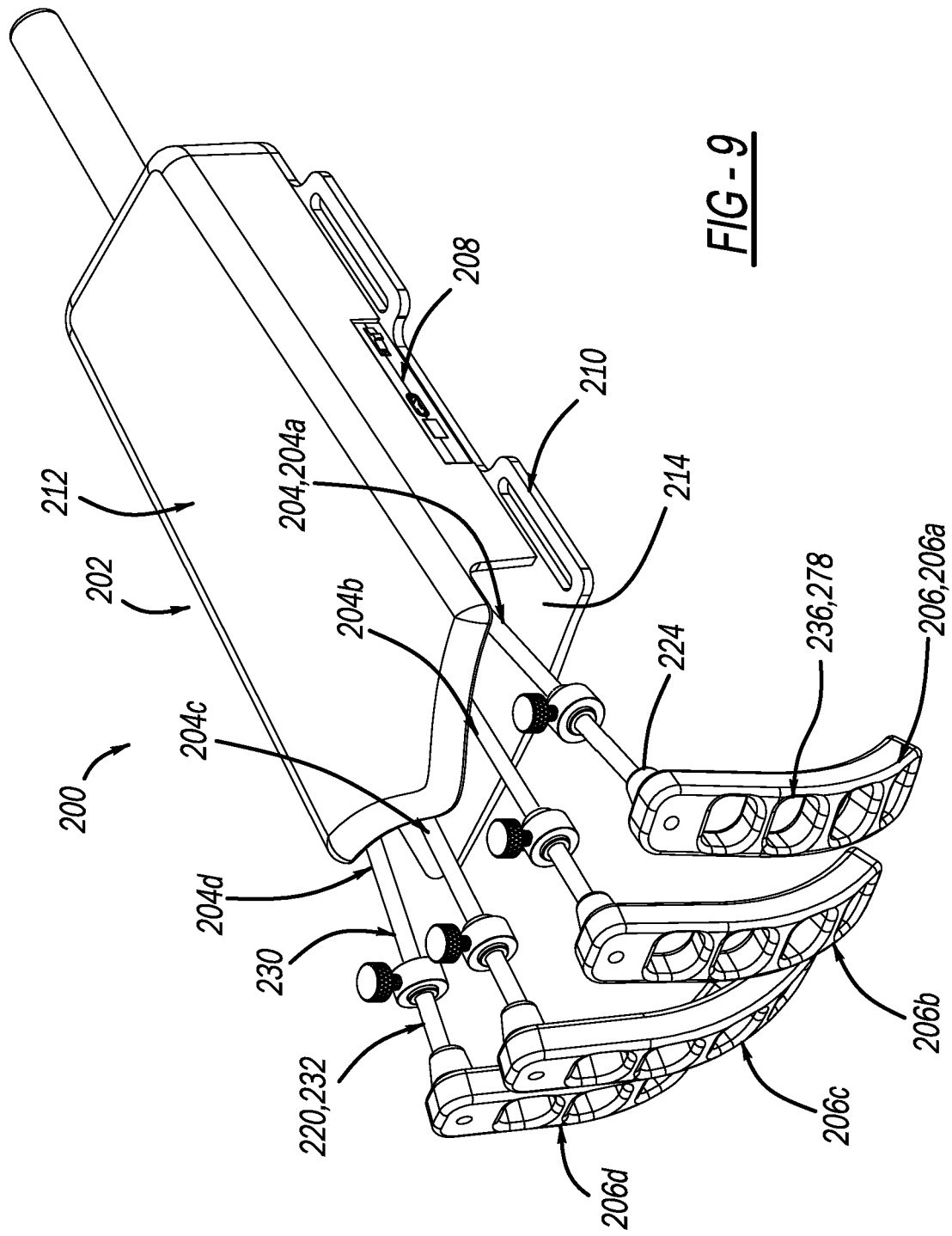
FIG. 9 is a top perspective view of a second example forearm assessment and training device.
Figure 10:
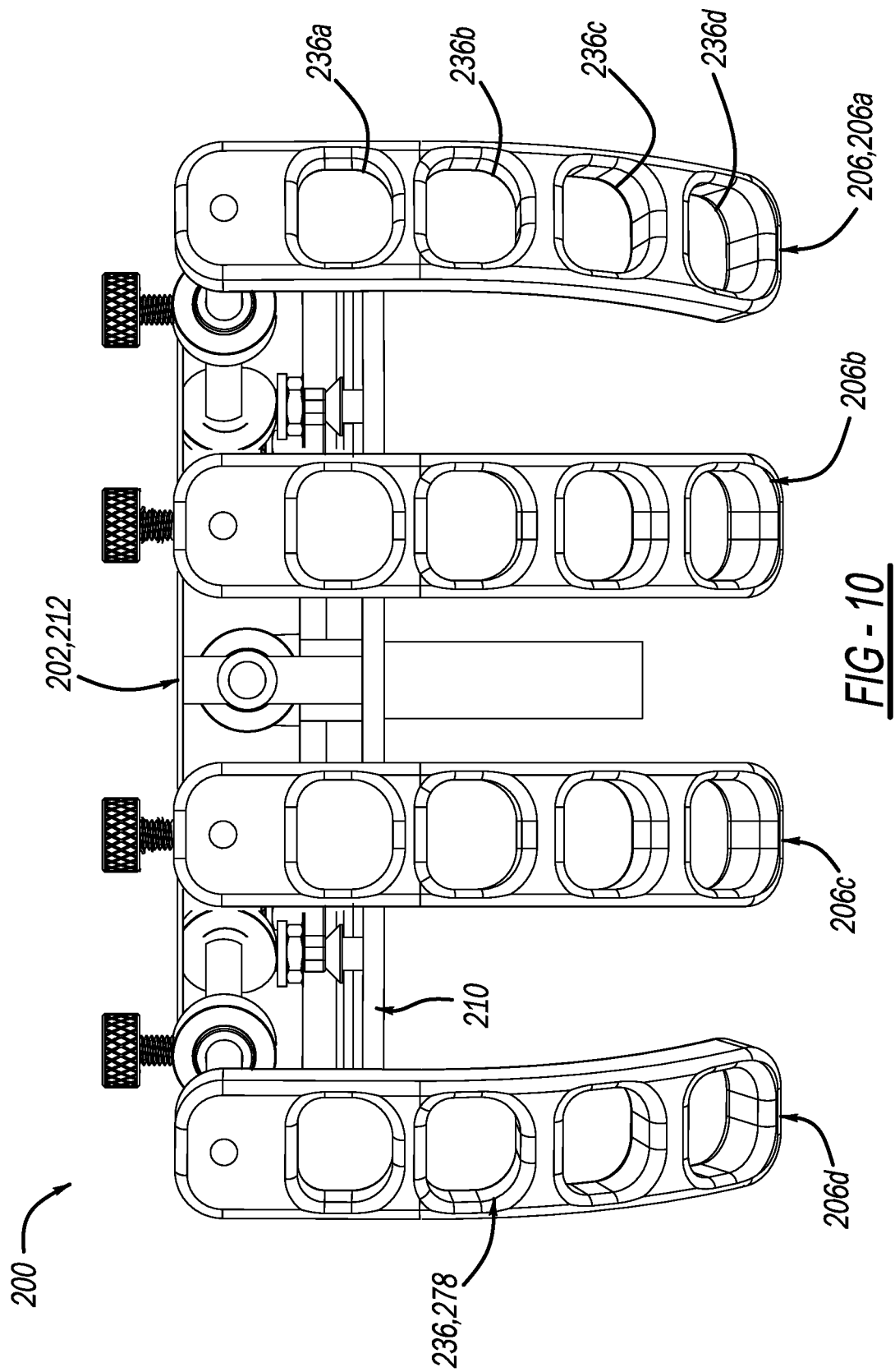
FIG. 10 is a front elevational view of the forearm assessment and training device shown in FIG. 9.
Figure 11:
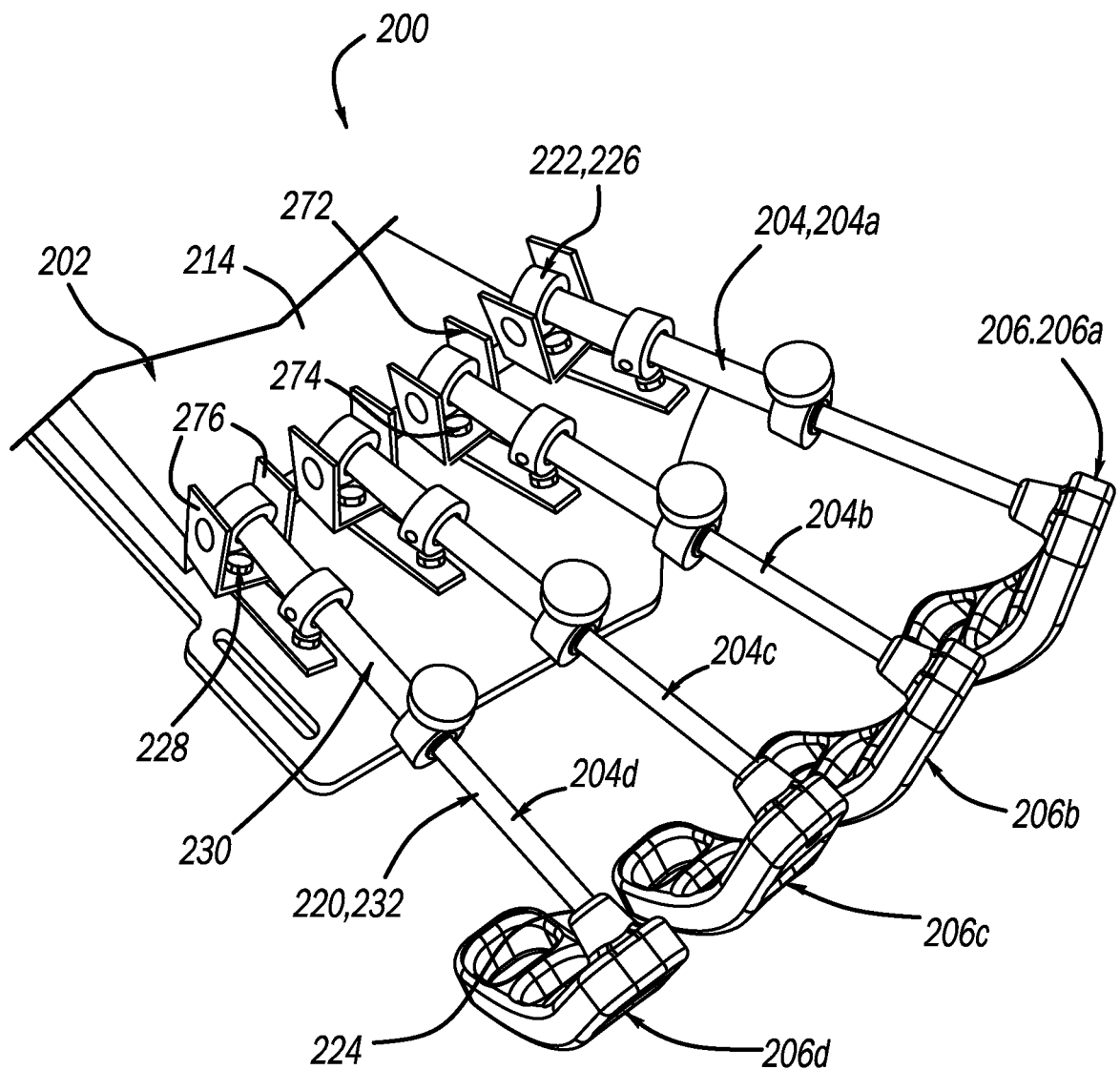
FIG. 11 a top perspective view of the forearm assessment and training device shown in FIG. The cover of the device is not included in FIG. 11.

FIGS. 9-11 illustrate another example forearm assessment and training device 200. The forearm assessment and training device 200 is similar to the forearm assessment and training device 100, except as described below. Thus, the forearm assessment and training device 200 has a main support 202, a plurality of finger motion transmission members 204, a plurality of finger receivers 206, and a control module 208. The main support 202 has a base 210 and a cover 212 disposed over the base 210. The base 210 has an inner surface 214 and an outer surface 216. Each of the finger motion transmission members 204 includes a member body 220 with a first end 222 and a second end 224. The first end 222 of one or more of the finger motion transmission members 204 is connected to the main support 202. The plurality of finger motion transmission members 204 include an index finger transmission member 204a, a middle finger transmission member 204b, a ring finger transmission member 204c, and a little finger transmission member 204d. The finger receivers 206 include an index finger receiver 206a, a middle finger receiver 206b, a ring finger receiver 206c, and a little finger receiver 206d.

In this embodiment, the first end 222 of one or more of the finger motion transmission members 204 includes a member linkage 226. The member linkage 226 has a joining bracket 272 and a standoff 228, as shown in FIG. 11. The joining bracket 272 has a bracket base 274 with two bracket walls 276. Each of the two bracket walls 276 is disposed substantially orthogonal to the bracket base 274. The first end 222 of one of the finger motion transmission members 204 is connected to both of the two bracket walls 276. The standoff 228 is connected to the bracket base 274 and disposed on the inner surface 214 of the base 210 of the main support 202. The standoff 228 elevates the connected finger motion transmission member from the inner surface 214 of the base 210 of the main support 202, which allows the connected finger motion transmission member 204 to bend and/or move along the standoff 228. The joining bracket 272 connects the first end of one of the finger motion transmission members 204 to the standoff 228, while also mitigating against the standoff 228 from being substantially biased in a given direction due to the bending and/or moving of the connected finger motion transmission member 204.

Each of the finger receivers 206 is connected to the member body 220 of one of the finger motion transmission members 204. Each of the finger receivers 206 is shown substantially curved towards the main support 202. However, each of the finger receivers 206 can be substantially straight, if desired. Each of the finger receivers 206 have a plurality of finger apertures 236 arranged in a column of finger apertures 278. Each of the plurality of finger apertures 236 is configured to receive a selected portion of one of the fingers of the user. The selected portion can be changed by moving the finger receivers 206 along the finger motion transmission members 204. For example, if the user wants to target the FDP, the user axially adjusts the desired finger receiver 206 until the corresponding finger aperture 236 is adjacent to and supporting the distal portion of the selected finger. In another example, if the user wants to target the FDS, the user axially adjusts finger receiver 206 until the corresponding finger aperture 236 is adjacent to and receiving the middle portion of the selected finger. Advantageously, the column of finger apertures 278 allows the user to selectively target the FDP and the FDS, as desired. In certain examples, each of the finger receivers 206 has a finger receiver locking mechanism. The finger receiver locking mechanism is configured to lock and unlock the corresponding finger receiver 206 into position. Non-limiting examples of the finger locking mechanism can include a squeeze lock, a thumbscrew, and/or other types of connection technologies and methods.

In certain examples, the member body 220 of one or more of the finger motion transmission members 204 includes a tube portion 230 and a rod portion 232. The tube portion 230 includes the first end 222 of the member body 220. The rod portion 232 includes the second end 224 of the member body 220. The tube portion 230 telescopically receives the rod portion 232, which can allow the rod portion 232 to be axially adjusted according to a length of a corresponding finger of a user, e.g., the rod portion 232 can be moved towards and away from the main support 202. Each of the finger motion transmission members 204 include a locking fastener 234. The locking fastener 234 is configured to lock and unlock the rod portion 232 to the tube portion 230, which can permit the user to lock and unlock the rod portion 232 into position. Each of the finger receivers 206 is connected to rod portion 232 of the main body. The selected portion of one of the fingers of the user can be changed by the user by axially adjusting the rod portion 232. For example, if the user wants to target the FDP, the user axially adjusts the rod portion 232 until the corresponding finger aperture 236 is adjacent to and supporting the distal portion of the selected finger. In another example, if the user wants to target the FDS, the user axially adjusts the rod portion 232 until the corresponding finger aperture 236 is adjacent to and receiving the middle portion of the selected finger. Advantageously, the column of finger apertures 278 allows the user to selectively target the FDP and the FDS, as desired.

In certain examples, the column of finger apertures 278 includes: a first finger aperture 236a; a second finger aperture 236b disposed adjacent to the first aperture 236a; a third finger aperture 236c disposed adjacent to the second finger aperture 236b; and a fourth finger aperture 236d disposed adjacent to the third finger aperture 236c. In particular examples, the column of finger apertures 278 includes the first finger aperture 236a, the second finger aperture 236b, the third finger aperture 236c. The user can adjust a proximity of one of the fingers of the user with the corresponding finger motion transmission member 204, by moving the finger to a different one of the finger apertures 236 within the column of finger apertures 278. Advantageously, this can allow the user to customize the fitting of the forearm assessment and training device 100. It should be appreciated that a skilled artisan can scale the number of the finger apertures 236, within the scope of this disclosure.

FIG. 10 illustrates an example system 300. The system 300 includes the forearm assessment and training device 100 and a software platform 302. The forearm assessment and training device 100 has the main support 102, the plurality of finger receivers 106, and the control module 108. However, it should be appreciated that the system 300 can include a forearm assessment and training device according to any embodiment, such as forearm assessment and training device 200. The software platform 302 is in communication with the control module 108. Communication between the software platform 302 and the control module 108 can be accomplished through wired connections and/or wireless connections. Non-limiting examples of wireless solutions include Bluetooth, Bluetooth LE, Wi-Fi, mobile broadband, and/or other known solutions. The software platform 302 can be configured to receive measurement data from the control module 108. Non-limiting examples of information included in the measurement data includes measurements of forces, timestamps of when the measurements occurred, rate of force development, and/or other related information. In particular examples, the measurement data include measured forces caused by flexion forces, extension forces, ulnar deviation forces, and/or radial deviation forces. However, it should be appreciated that one skilled in the art can select other information to include within the measurement data, as desired.

In certain examples, the software platform 302 is configured to generate a reportable based on the measurement data received from the control module 108. This can be accomplished using a variety of algorithms, machine learning, artificial intelligence, and/or similar equivalents. The reportable includes audio and visual content, which the user can use for diagnostic, improvement, and rehabilitation purposes. Non-limiting examples of the reportable include a summary (which can include a summary of performed motions, events, activities), an injury risk assessment, a readiness assessment, a performance improvement plan, and a rehabilitation plan. Advantageously, the user can review the reportable and make self-guided adjustments to a performed motion. In addition, the reportable provides feedback to the user based on a computational review of the measurement data. This is considered advantageous at least because the software platform 302 is expected to be able to detect patterns in the measurement data that are not detected by human review. It should be appreciated that the reportable can include additional information that may be relevant to a user, within the scope of this disclosure.

The summary has relevant information about the motion currently being performed and/or had been performed. In particular examples, the summary includes the number of times a motion was performed, the force applied in real time, the maximum voluntary contraction (MVC), the force applied to individual fingers, the summation of the forces applied across all the fingers, the force applied to the wrist, the targeted amount of force, and etc. Desirably, the summary of the motion provides a concise breakdown of the motion for the user, including the relevant information isolated by finger and/or wrist.

The performance improvement plan includes performance enhancing suggestions based on the measurement data. For example, the performance improvement plan can include measured forces that were applied to the index, middle, and/or combined index/middle finger strength and rate of force development to assess likelihood of success in development of various pitches (e.g., 4 seam, 2 seam, cutter, slider, curveball, change). In addition, the performance improvement plan can identify if finger flexion strength is a limiting a pitcher's velocity and/or if finger flexion strength and/or endurance is limiting a pitcher's control. Advantageously, the performance improvement plan can facilitate the identification of free agents who have unrealized potential (e.g., starters who fade because of fatigue deficits, high velocity pitchers with control problems due to insufficient finger flexion strength, and pitchers with potential to significantly enhance run or cut). In a certain embodiment, the performance improvement plan can be used in combination with a neuromuscular application of force to mimic force required to create various pitch movement profiles or accentuate current strengths (e.g., increase run, cut, or vertical movement by training rate of force development in finger most responsible for producing the desired movement).

The injury risk assessment includes a risk assessment of certain muscles based on correlations and interpretations of the measurement data. For example, the injury risk assessment can include predictions if a particular muscle, such as the FDP, FDS, and FCU of the user, is likely to be fatigued based on forces applied during the motion. Desirably, the injury risk assessment is used to take corrective action to prevent future flexor strain or an injury to the UCL.

The readiness assessment includes a readiness assessment of certain muscles based on correlations and interpretations of the measurement data. For example, the readiness assessment can include assessments of whether a particular muscle, such as the FDP, FDS, and FCU of the user, is fatigued based on forces applied during the motion. Desirably, the readiness assessment is used to alert the user as to whether the muscles and tendons optimally positioned to protect the UCL are in weakened state.

The rehabilitation plan includes suggestions on how to improve fatigued and/or damaged muscles based on the measurement data. For example, the rehabilitation plan can include measured forces to identify which muscle tendons were most affected by flexor tendon strain to optimize rehabilitation. In addition, the rehabilitation plan can include structured rehabilitation plans, such as suggestions for certain motions to be performed to assist in rehabilitated fatigued and/or damaged muscles. Advantageously, the rehabilitation plan assists the user to return to play after an injury.

As illustrated in FIG. 12, the software platform 302 can include an administration server 304. The administration server 304 includes an administration server processor 306 and administration server memory 308. The administration server memory 308 includes a tangible, non-transitory computer readable medium with stored processor-executable instructions. The administration server 304 can be configured to receive the measurement data from the control module 108, store the measurement data in the memory, and/or generate the reportable based on the measurement data. Other features and functions of the administration server 304 are also contemplated. Desirably, the administration server 304 offload computations that can be resource intensive for the control module 108. It should be appreciated that one skilled in the art can employ additional servers for the software platform 302, as desired. In addition, a skilled artisan can employ additional server-based features, such as a cloud-based server, a serverless script repository, or other cloud-based computing resources.

The software platform 302 includes a user application 310. Non-limiting examples of the user application 310 include desktop applications, mobile applications, and web applications. The user application 310 can be accessible by a user terminal 312. Examples of the user terminal 312 include desktop computers, laptops, mobile phones, tablets, and other suitable solutions. The user application 310 can be configured to permit the user to interface with the measurement data and/or the reportable. Other features include creating a user account, adjusting user settings, creating motion plans, and/or importing premade motion plans.

In a certain embodiment, a strength improvement kit includes the forearm assessment and training device 100 and the wrist motion transmission member 154. The forearm assessment and training device 100 has the main support 102, the finger motion transmission members 104, the finger receivers 106, and the control module 108. The wrist motion transmission member 152 is configured to be selectively attached to the main support 102. Desirably, this allows the user to selectively attach the wrist motion transmission member 154 to the forearm assessment and training device 100, when desired. It should be appreciated that the strength improvement kit can include the forearm assessment and training device 200.

Figure 13:
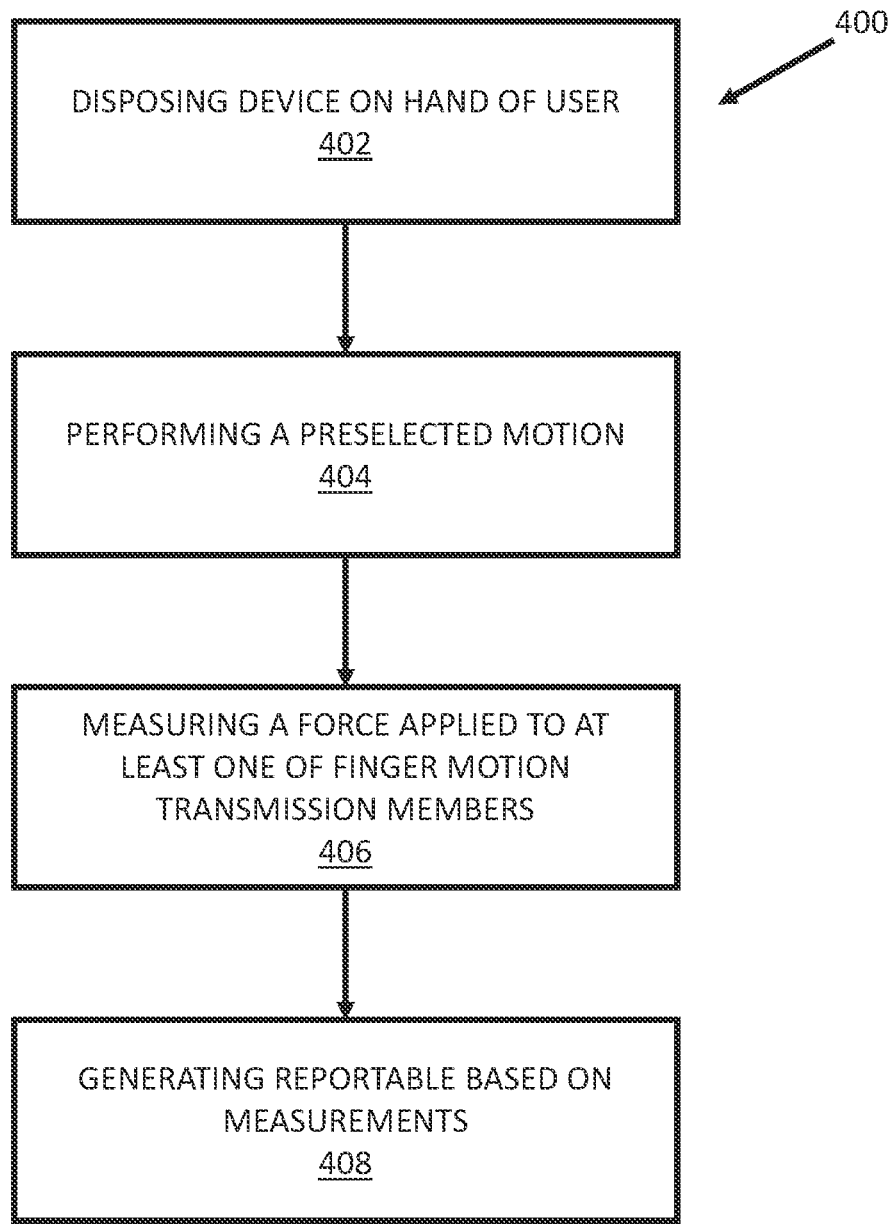
FIG. 13 is a flowchart illustration of an example method of assessing and training an individual.

FIG. 13 illustrates an example method 400 for using the forearm assessment and training device 100 is shown. The method 400 has a step 402 of disposing the forearm assessment and training device 100 on the hand of the user. In certain examples, this can include disposing a hand securement member between the user and the forearm assessment and training device 100. In a step 404, a preselected motion can be performed while the device 100 is disposed on the hand of user. The preselected motion can include a motion, exercise, activity, and/or similar equivalent. In a step 406, the sensor 160 measures the force applied to at least one of the finger motion transmission members 104, which corresponds to the preselected motion. In certain examples, the step 206 includes the sensor 160 measuring the force applied to the wrist motion transmission member 154. In addition, in certain examples, the method 400 includes a step 408, where a reportable is generated based on the measurements made in the step 406. It should be appreciated that the method 400 can also apply to the forearm assessment and training device 200.

In particular methods, the preselected motion can include preselected exercise regimens, including a balance-focused regimen, an endurance-focused regimen, a strength-focused regimen, an explosion-focused regimen, and a maintenance-focused regimen.

The balance-focused regimen includes having a user perform a prescribed set of exercises for the purpose of balancing the strength of the muscle tendon units of the forearm that control flexion and extension of the wrist and fingers, and/or ulnar and radial deviation of the wrist. Desirably, the balance-focused regimen is designed to militate against forearm imbalances, which can lead to injuries. In certain examples, the balance-focused regimen is performed three times a week for four weeks.

The endurance-focused regimen includes having a user perform a prescribed set of exercises for the purpose of increasing the endurance of the muscle tendon units of the forearm that control flexion and extension of the wrist and fingers, and/or ulnar and radial deviation of the wrist. The endurance-focused regimen is designed to reduce the rate of fatigue in the FDS, the FCU, and FDP of the user. Advantageously, this can directly correlate to reducing the risk of UCL tear and maintain velo, command, and movement longer during a pitch. In certain examples, the endurance-focused regimen is preformed three times a week for four to six weeks.

The strength-focused regimen includes having a user perform a prescribed set of exercises for the purpose of increasing the strength of the muscle tendon units of the forearm that control flexion and extension of the wrist and fingers, and/or ulnar and radial deviation of the wrist. The strength-focused regimen is designed to increase strength gains in the FDS, the FCU, and the FDP to increase their stiffness. Greater stiffness reduces the UCL torque and increases the rate of force development. In addition, these strength gains can also improve command during a pitch. In certain examples, the strength-focused regimen is preformed three times a week for twelve weeks.

The explosion-focused regimen includes having a user perform a prescribed set of exercises for the purpose of increasing the explosiveness of the muscle tendon units of the forearm that control flexion and extension of the wrist and fingers, or ulnar and radial deviation of the wrist. The explosion-focused regimen is designed to increase the amount and speed of finger flexion and ulnar deviation force. This can enhance velo, movement and command during a pitch. In certain examples, the explosion-focused regimen is preformed three times a week for four weeks.

The maintenance-focused regimen includes having a user perform a prescribed set of exercises for the purpose of maintaining the balance, endurance, strength, and explosiveness of the muscle tendon units of the forearm that control flexion and extension of the wrist and fingers, and/or ulnar and radial deviation of the wrist achieved from each regimen. The maintenance-focused regimen is designed to preserve training gains, since 80% of muscle/tension stiffness gains are lost after twelve weeks of de-training. This militates against the UCL from being vulnerable to forces after muscles/tensons lose stiffness.

EXAMPLES

Example 1—Evaluation Experiment

An evaluation was conducted to determine if an example forearm assessment and training device would be successful in targeting the FDP, FDS, and the FCU. Needle electromyography (EMG) was performed on a subject as the subject applied various forces while wearing a forearm assessment and training device similar to the forearm assessment and training device 100.

In a first test, a flexion force was applied by the subject while each fingertip of the subject was connected to the finger aperture 136 of one of the finger receivers 106. While the subject applied the flexion force in this configuration, motor unit amplitude signals from the FDP demonstrated increased amplitudes than those from the FDS when the subject applied comparable forces. The tension in the FDP was 60% higher than that of the FDS, which translated into an FDP to FDS tendon-force ratio of 1.75:1. Therefore, this configuration can be used to target the FDP.

In a second test, a flexion force was applied by the subject while the middle portion of each finger of the subject was connected to one of the adjustable finger slings 152. While the subject applied the flexion force in this configuration, the motor unit amplitude signals from the FDS demonstrated increased amplitudes compared to the FDP. Therefore, this configuration can be used to target the FDS.

In a third test, an ulnar deviation force was applied by the subject while the wrist motion transmission member 154 was secured to the forearm of the user. While the subject applied the ulnar deviation force in this configuration, the motor unit amplitude signals from the FCU were increased. Therefore, this configuration can be used to target the FCU.

Example 2—Training Experiment

An experiment was conducted using a forearm assessment and training device similar to the forearm assessment and training device 100 to determine endurance and strength changes on thirty professional minor league baseball players over a four week period. Before training on the device, baseline strength and endurance were measured on all players. Strength was measured by having players apply maximum effort (considered to be a maximum voluntary contraction or MVC) using first all four fingers simultaneously then their index finger, middle, finger, ring finger and little finger in isolation, while performing first flexion exercises from the distal attachment (FDP), then extension exercises from the distal attachment (FDP), then flexion exercises from the mid finger attachment (FDS).

Endurance was measured by having players apply maximum flexion effort simultaneously with their middle and index fingers from the distal attachment (FDP) over four sets of six repetitions with a five second rest between each rep and a fifteen second rest in between sets. Endurance was measured by comparing the percentage of decline from a player's first set highest force versus his fourth set lowest force.

Once testing was complete, all players then trained on the device for three to four weeks performing a strength-focused regimen. Following said training period, strength and endurance were re-assessed. The strength-focused regimen included performing one set of five repetitions of four finger, index finger, middle, finger, ring finger then little finger flexion exercises with device positioned to optimally target the FDP on one training day, one set of five repetitions of four finger, index finger, middle, finger, ring finger then little finger extension exercises the next training day, followed by one set of five repetitions of four finger, index finger, middle, finger, ring finger then little finger flexion exercises the next training day with device positioned to optimally target the FDS, and then repeating the cycle. For each exercise, users were instructed to apply one hundred percent maximum voluntary contraction on their first repetition, to be followed by applying seventy percent of the force applied during their first repetition over the remaining four repetitions and maintaining that force for eight seconds throughout each repetition. Table A shows the average change in units of force achieved from all participants in both strength and endurance as a result of performing this training protocol.

TABLE A

|  | Strength increase: 4 finger flexion MVC (FDP) Dominant arm | Strength increase: 4 finger extension MVC | Endurance: MVC decline from $1^{st}$ set highest rep to $4^{th}$ set lowest rep (excl 8 players who threw within 2 days of final test) |
|---|---|---|---|
| Baseline |  |  | 33% |
| Final testing day | 23% | 25% | 20% (8%) |

Advantageously, the forearm assessment and training devices 100, 200, system 300, kit and method 400 permit the user to diagnosis problems associated with performing the preselected motion, improve performance of the preselected motion, and/or rehabilitate fatigued and/or damaged muscles. In addition, the forearm assessment and training devices 100, 200 can be disposed on the back of the hand of the user while performing natural athletic movements.

Those with ordinary skill in the art will appreciate that various modifications and alternatives for the described and illustrated examples can be developed in light of the overall teachings of the disclosure, and that the various elements and features of one example described and illustrated herein can be combined with various elements and features of another example without departing from the scope of the invention. Accordingly, the particular examples disclosed herein have been selected by the inventors simply to describe and illustrate examples of the invention and are not intended to limit the scope of the invention or its protection, which is to be given the full breadth of the appended claims and any and all equivalents thereof.

We claim:

1. A forearm assessment and training device, comprising:
   a main support;
   a plurality of finger motion transmission members, each of the finger motion transmission members having a member body including a first end and a second end, the first end of the member body of each of the finger motion transmission members connected to the main support;
   a plurality of finger receivers, each of the finger receivers connected to the member body of one of the finger motion transmission members and having a plurality of finger apertures arranged in a column of finger apertures, each finger aperture of the plurality of finger apertures configured to receive a portion of a finger of a user; and a control module connected to the main support, the control module having a control module processor, a control module memory, and a sensor, the control module memory including a tangible, non-transitory computer readable medium with stored processor-executable instructions, the sensor configured to measure a force applied to at least one of the finger motion transmission members;

wherein each finger receiver curves toward the main support as the finger receiver extends away from the member body to which it is connected.

2. The forearm assessment and training device of claim 1, wherein the member body of each of the finger motion transmission members includes a tube portion and a rod portion, the tube portion including the first end of the member body and the rod portion including the second end of the member body, the tube portion telescopically receiving the rod portion, thereby allowing the rod portion of each of finger motion transmission members to be axially adjusted according to a length of a corresponding finger of the user.

3. The forearm assessment and training device of claim 1, further comprising a wrist motion transmission member connected to the main support and configured to be secured to a forearm of the user, wherein the sensor is further configured to measure a force applied to the wrist motion transmission member.

4. The forearm assessment and training device of claim 1, further comprising a plurality of adjustable finger slings, each of the adjustable finger slings connected to one of the finger motion transmission members and configured to receive and support a finger of the user.

5. The forearm assessment and training device of claim 1, wherein the sensor includes a plurality of sensors, each of the sensors configured to measure a force applied to one of the finger motion transmission members.

6. The forearm assessment and training device of claim 1, wherein the control module is configured to measure the force applied to at least one of the finger motion transmission members at preselected intervals.

7. The forearm assessment and training device of claim 1, wherein the main support includes a pair of slots configured to receive a hand strap to secure the main support to a hand of the user.

8. The forearm assessment and training device of claim 1, wherein a portion of each finger receiver extends along an axis that is perpendicular to an axis of the member body of the finger motion transmission member to which the finger receiver is attached.

9. The forearm assessment and training device of claim 8, wherein the portion includes at least one finger aperture of the plurality of finger apertures.

10. The forearm assessment and training device of claim 1, wherein each finger receiver is connected to the second end of the member body of at least one finger motion transmission member of the plurality of finger motion transmission members.

\* \* \* \* \*